J. W. AND N. J. SCHRAM.
CIRCUIT CLOSER FOR VEHICLE SIGNALS.
APPLICATION FILED DEC. 19, 1917.
1,335,610.
Patented Mar. 30, 1920.
2 SHEETS—SHEET 1.
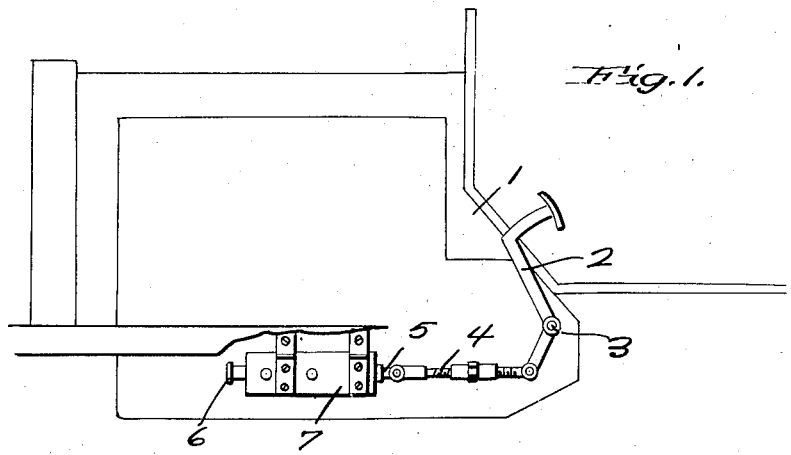
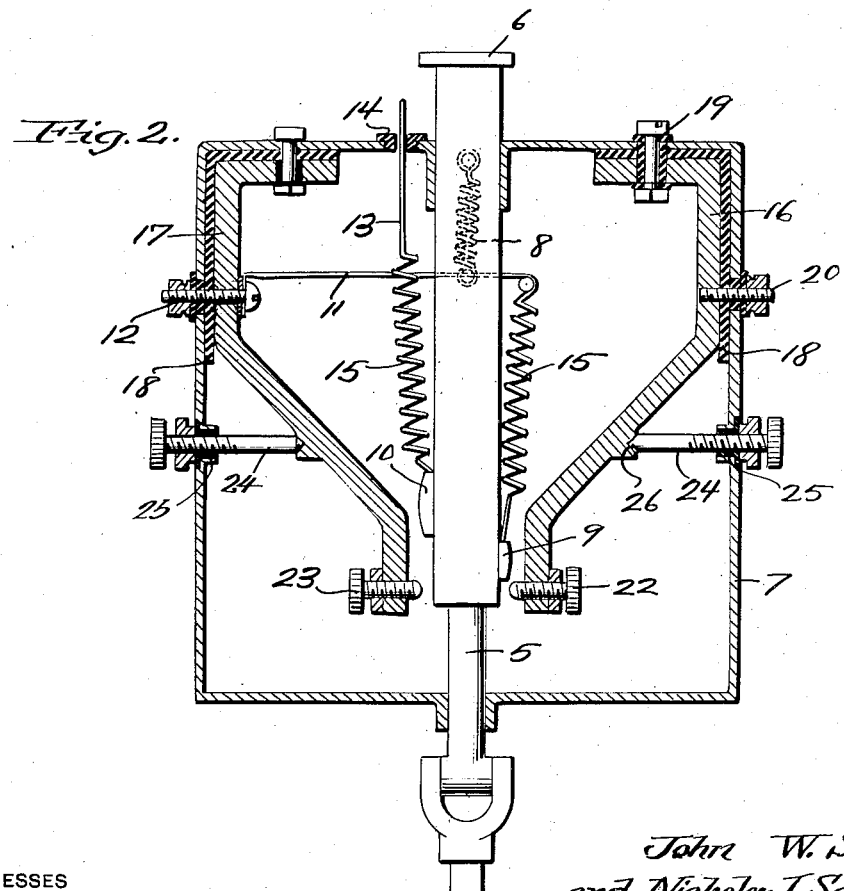
WITNESSES
INVENTOR
John W. Schram,
and Nicholas J. Schram,
BY
ATTORNEY

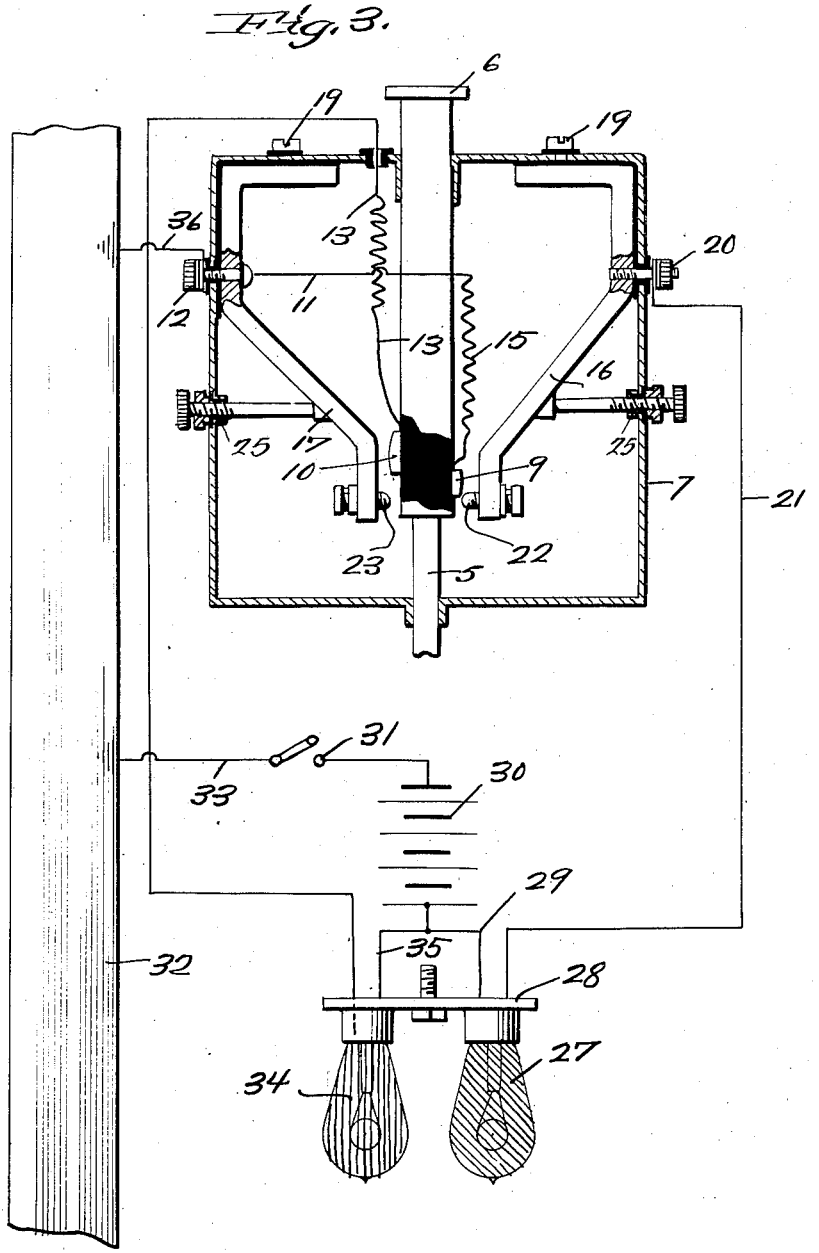

UNITED STATES PATENT OFFICE.

JOHN W. SCHRAM AND NICHOLAS J. SCHRAM, OF FLINT, MICHIGAN.

CIRCUIT-CLOSER FOR VEHICLE-SIGNALS.

1,335,610. Specification of Letters Patent. Patented Mar. 30, 1920.

Application filed December 19, 1917. Serial No. 207,941.

*To all whom it may concern:*

Be it known that we, JOHN W. SCHRAM and NICHOLAS J. SCHRAM, citizens of the United States, residing at Flint, in the county of Genesee and State of Michigan, have invented certain new and useful Improvements in Circuit-Closers for Vehicle-Signals, of which the following is a specification.

This invention relates to automobile safety signals or signaling devices for vehicles and the like and has for its object the production of a simple and efficient means for automatically operating a signal as the brakes of a vehicle are applied.

Another object of this invention is the production of a simple and efficient circuit closing means for automatically operating a signal when the brakes of a vehicle are applied.

With these and other objects in view this invention consists of certain novel constructions, combinations and arrangements of parts as will be hereinafter fully described and claimed.

In the drawings:—

Figure 1 is a side elevation of the contact casing showing the same carried by an automobile and operated by a brake treadle.

Fig. 2 is a longitudinal section through the circuit closing casing.

Fig. 3 is a diagrammatic view of the circuits involved for operating the signal lamps, the contact casing being shown in section.

By referring to the drawings, it will be seen that 1 designates a body of an automobile or other vehicle upon which is mounted a foot treadle 2. This foot treadle 2 is carried by a journal 3 and the lower end of this treadle 2 is connected to an adjustable link connection 4, this adjustable link connection 4 being connected to a circuit closing plunger 5. This plunger 5 is provided with an enlarged end plate 6 for limiting the longitudinal movement 5 within the casing 7. A coil spring 8 is connected to one end to the plunger 5 and is connected at the other end to the casing 7 for normally holding the plunger 5 in an open position.

The plunger 5 is provided with a primary contact knob 9 upon one side thereof and an auxiliary contact knob 10 upon the opposite side thereof. The primary contact knob 9 is electrically connected to a wire 11 which wire 11 is connected to a binding post 12, which binding post 12 is insulated upon the casing 7. The auxiliary contact knob 10 is electrically connected to a conducting wire 13 passing through a bushing 14 which is formed of insulating material and is carried by the casing 7. The inner end of each of the wires 11 and 13 is coiled as indicated at 15 for the purpose of permitting the plunger 5 to reciprocate within the casing 7 without causing any undue strain upon the wires 11 and 13.

Contact brackets 16 and 17 are supported upon or within the casing 7 and are insulated therefrom by means of insulating strips 18 shown clearly in Fig. 2 of the drawings. Suitable securing bolts 19 pass through the contact brackets 16 and 17 and firmly connect these brackets to the casing 7, these bolts being insulated from the casing. A binding post 20 is carried by the bracket 16 and is insulated from the casing 7 and a conducting wire 21 is electrically connected to this binding post 20. Contact screws 22 and 23 are carried by the lower ends of the respective brackets 16 and 17 and are adapted to contact with the contact knobs 9 and 10 carried by the plunger 5. These brackets 16 and 17 are formed of spring material and are capable of being adjusted within the casing 7 in order to insure a proper contact between the screws 22 and 23 and the contact knobs 9 and 10.

An adjusting screw 24 is carried upon each side of the casing 7 and is threaded through an insulating collar 25, the inner end of this adjusting screw 24 engaging a socket 26 formed in the body of the respective brackets 16 and 17. By considering Fig. 2 it will be seen that the lower ends of the brackets 16 and 17 may be conveniently adjusted to insure an efficient contact with the contact knobs carried by the plunger 5.

By referring particularly to Fig. 3 it will be seen that the wire 21 is electrically connected to a green or caution light 27 and this light 27 is supported in any suitable or desired manner upon a bracket 28 located in a convenient place upon the body of an automobile. This lamp 27 is electrically connected by means of a wire 29 to a source of electrical supply 30 such for instance as a battery, magneto and the like and this source of electrical supply 30 is connected to a switch 31, the switch 31 being grounded upon the frame 32 by means of a wire 33. A red or danger light 34 is carried by a bracket 28 and this light 34 is electrically connected to a source of electrical supply 30 by means of a wire 35, the opposite side of the lamp 34 being connected to the wire 13. The wire 11 which is electrically connected to the binding post 12 is grounded upon the casing 32 by means of a wire 36.

As shown in Fig. 3 the contact knobs 9 and 10 are insulated upon the plunger 5 and as shown in Fig. 1 this plunger 5 is connected directly to the brake treadle 2. As soon as the operator desires to cause the automobile which he is driving, to slow down, he will apply a slight pressure to the brake treadle 2 thereby pulling the plunger 5 forwardly and causing the contact knob 9 to contact with the contact screw 22, in this manner closing an electric circuit therethrough. The current will then pass from the source of electric supply 30 up through the wire 33 to the casing 32, through the wire 36, through the wire 11 to the contact knob 9, through the bracket 16, and back to the battery 30, through the wire 29. In this way, the green light 27 will be lighted and the person driving a following vehicle will be notified to use caution and will be advised that the preceding vehicle has retarded its previous rate of speed. Should it be desired to bring the car to a stop, such for instance as applying the emergency brake, the plunger 5 will be moved forwardly to a greater distance than previously described, in order to bring the contact knob 10 into engagement with the contact screw 23. As soon as a circuit has been closed between the contact knob 10 and the screw 23, the current will pass from the battery 30 to the wire 33, through the frame 32, through the wire 36, through the bracket 17. The current will pass from the bracket 17 and contact screw 23, through the contact knob 10, up through the wire 13 and to the red light 34, and then up through the wire 35 to the battery 30.

From the foregoing description it will be seen that a very simple and efficient device has been produced for permitting the driver of one motor vehicle to give a safety signal to the driver of a following vehicle, by indicating to the driver of a following vehicle that he is retarding his speed or that he is applying the brakes for the purpose of coming to a stop. It should be understood of course that the lights 27 and 34 may be thrown on and off manually when so desired by the operation of the switch 31.

It should be of course understood that certain obvious detail mechanical changes may be made in the present device without departing from the spirit of the invention, so long as these changes fall within the scope of the appended claim.

What is claimed is:—

A switch comprising a casing, a plurality of contact brackets secured within said casing and insulated therefrom, each bracket provided with an inwardly inclined portion terminating in a depending extremity, an adjusting contact screw threaded through each extremity, an adjusting screw secured to each side of said casing, and engaging the inclined portion of said bracket for facilitating the adjustment of said bracket, a longitudinally movable plunger slidably mounted within said casing, a contact knob secured upon each of two opposite sides of said plunger, means connected to said knobs for conducting an electrical current thereto, said knobs adapted to contact alternately with the contact screws carried by the extremities of said brackets, and said knobs arranged alternately on said plunger whereby only one of said knobs will contact with one of said contact screws at a time.

In testimony whereof we affix our signatures in presence of two witnesses.

JOHN W. SCHRAM.
NICHOLAS J. SCHRAM.

Witnesses:
  CHAS. FISHER,
  JOHN SEYMORE.